(12) United States Patent
Loew et al.

(10) Patent No.: US 10,086,746 B2
(45) Date of Patent: Oct. 2, 2018

(54) ADJUSTABLE TRUCK BED DIVIDER WITH DUAL ROLL COVERS

(71) Applicant: FORD GLOBAL TECHNOLOGIES, LLC, Dearborn, MI (US)

(72) Inventors: Pattrick Loew, Dearborn, MI (US); Daniel Robert Taylor, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 15/201,861

(22) Filed: Jul. 5, 2016

(65) Prior Publication Data

US 2018/0009363 A1 Jan. 11, 2018

(51) Int. Cl.
*B60P 7/14* (2006.01)
*B60P 7/04* (2006.01)

(52) U.S. Cl.
CPC .. *B60P 7/14* (2013.01); *B60P 7/04* (2013.01)

(58) Field of Classification Search
CPC .................................... B60P 7/04; B60P 7/14
USPC ........................................................ 296/98
See application file for complete search history.

(56) References Cited

U.S. PATENT DOCUMENTS

| | | | |
|---|---|---|---|
| 4,929,016 A | 5/1990 | Kastanis | |
| 6,152,517 A * | 11/2000 | Steadman | B60J 7/068 296/100.11 |
| 6,217,103 B1 | 4/2001 | Schultz et al. | |
| 6,626,624 B1 | 9/2003 | Kopperud | |
| 6,712,419 B1 * | 3/2004 | Gothier | B60J 7/085 296/100.15 |
| 7,275,780 B2 * | 10/2007 | Boyd | B60J 7/085 296/100.01 |
| 7,311,112 B2 * | 12/2007 | Pacheco | B60J 11/02 135/88.05 |
| 7,695,047 B2 | 4/2010 | Kohlstrand | |
| 2004/0047703 A1 | 3/2004 | Bernardo | |
| 2004/0232726 A1 * | 11/2004 | Legge | B60P 7/0892 296/182.1 |
| 2004/0238089 A1 | 12/2004 | Li et al. | |
| 2005/0152761 A1 | 7/2005 | Silamianos et al. | |
| 2008/0121349 A1 | 5/2008 | De La Cruz | |
| 2014/0097634 A1 | 4/2014 | Jones et al. | |

* cited by examiner

*Primary Examiner* — Joseph D. Pape
(74) *Attorney, Agent, or Firm* — Jason Rogers; King & Schickli, PLLC (57) ABSTRACT

A truck bed divider assembly includes a body, a first roller, a first cover wound on the first roller, a second roller and a second cover wound on the second roller.

18 Claims, 7 Drawing Sheets

ADJUSTABLE TRUCK BED DIVIDER WITH DUAL ROLL COVERS

TECHNICAL FIELD

This document relates generally to the motor vehicle equipment field and, more particularly, to an adjustable truck bed divider including dual roll covers.

BACKGROUND

Trucks, such as pickup trucks are equipped with large cargo beds to receive and hold large cargo items such as sheets of plywood, sheets of drywall and the like. Of course, large cargo beds suitable for this purpose may present a problem with respect to transporting and securing smaller cargo items.

In order to address this issue, truck bed dividers have been developed in order to partition the cargo bed into smaller, defined spaces suitable for transporting smaller cargo items. While useful for their intended purpose, truck bed dividers developed to date may be difficult to adjust, often requiring a user to first adjust the divider at one side of the cargo bed before walking around and adjusting the divider at the opposite side. Further, the design of prior art bed dividers often limits their versatility limiting the use of the bed dividers to particular applications.

This document relates to a new and improved adjustable truck bed divider that is very easy to use while also providing enhanced versatility suited to a wide range of applications.

SUMMARY

In accordance with the purposes and benefits described herein, a truck bed divider assembly is provided. That truck bed divider assembly comprises a body, a first roller, a first cover wound on the first roller, a second roller carried on the body and a second cover wound on the second roller. In one of many possible embodiments, the body carries or holds the first roller and the second roller.

The truck bed divider assembly may also include a guide track and a drive mechanism that displaces the body along the guide track. Further, the truck bed divider assembly may include a first lock bar at a first distal end of the first cover. In addition, the truck bed divider assembly may include a first receiver at a first end of the truck bed. That first receiver is adapted to receive and hold the first lock bar when the first cover is deployed from the first roller. In addition, the truck bed divider assembly may include a second lock bar at a second distal end of the second cover. Further, the truck bed divider assembly may include a second receiver at a second end of the truck bed. The second receiver may be adapted to receive and hold the second lock bar when the second cover is deployed from the second roller.

The guide track may include a first guide rail at a first transverse end of the body and a second guide rail at a second transverse end of the body. The drive mechanism may include a first drive screw at the first end of the body and a first drive motor for turning the first drive screw. Further, the drive mechanism may include a second drive screw at the second end of the body and a second drive motor for turning the second drive screw.

Still further, the guide track may include a third guide rail at the first end of the body and a fourth guide rail at the second end of the body. In such an embodiment, the first drive screw may extend between the first guide rail and the third guide rail while the second drive screw may extend between the second guide rail and the fourth guide rail.

Still further, the body of the truck bed divider assembly may comprise a carriage having a first slider on the first guide rail, a second slider on the second guide rail, a third slider on the third guide rail and a fourth slider on the fourth guide rail. In addition, the carriage my further include a first drive link engaging the first drive screw and a second drive link engaging the second drive screw. Still further, the body may also include a cap overlying the first roller and the second roller and protecting the two rollers from inclement weather.

Still further, the truck bed divider assembly may also include a bed partition. A hinge assembly may be provided for pivotally connecting the bed partition to the body.

In the following description, there are shown and described several preferred embodiments of the truck bed divider assembly. As it should be realized, the truck bed divider assembly is capable of other, different embodiments and its several details are capable of modification in various, obvious aspects all without departing from the truck bed divider assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the truck bed divider assembly and together with the description serve to explain certain principles thereof. In the drawing figures.

Reference will now be made in detail to the present preferred embodiments of the truck bed divider assembly, examples of which are illustrated in the accompanying drawing figures.

DETAILED DESCRIPTION

Figure 1:
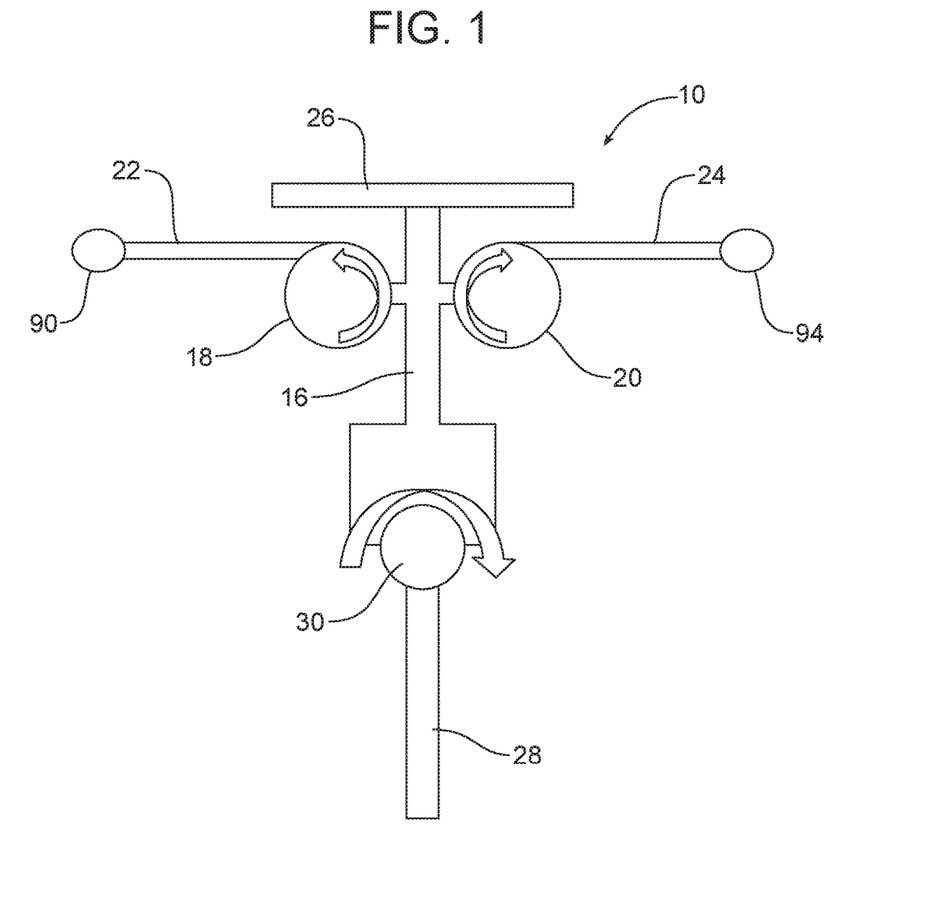
FIG. 1 is a schematic end view of one possible embodiment of the truck bed divider assembly.
Figure 2:
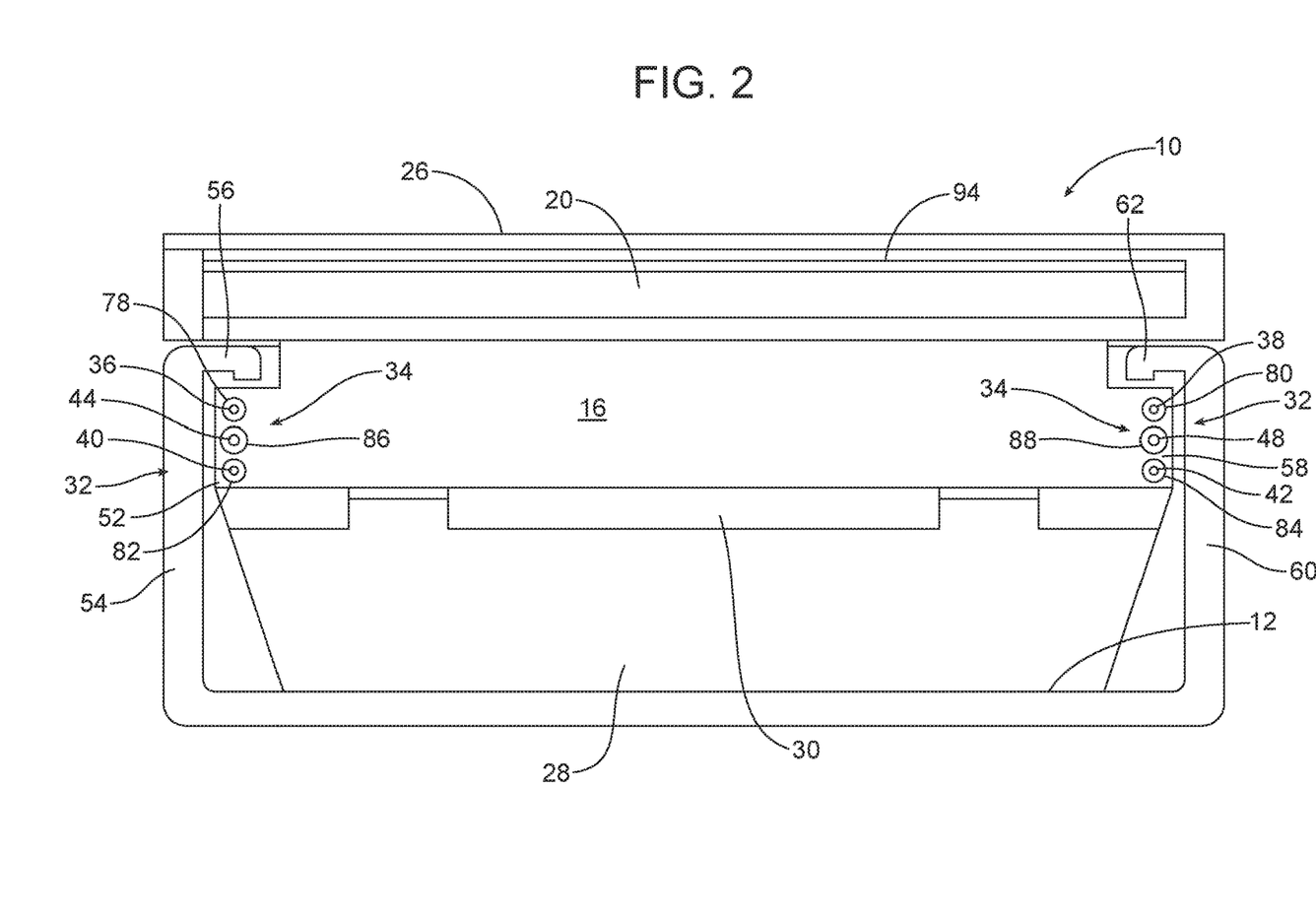
FIG. 2 is a schematic rear plan view of the truck bed divider assembly illustrated in FIG. 1.

Reference is now made to FIGS. 1-7 illustrating a truck bed divider assembly 10 for dividing or partitioning the cargo bed 12 of a pickup truck 14. As best illustrated in FIGS. 1 and 2, the truck bed divider assembly 10 includes a body 16 that carries a first roller 18 on a front side thereof and a second roller 20 on a rear side thereof. The first roller 18 and second roller 20 are both mounted to the body 16 in a manner that allows for rotation of the rollers. A first cover 22 is wound on the first roller 18. A second cover 24 is wound on the second roller 20. The body 16 may include a cap 26. The cap 26 overlies the first roller 18 and the second roller 20 and protects the two rollers from rain, sleet, snow and ice.

As further illustrated in FIGS. 1 and 2, a bed partition 28 depends from the bottom of the body 16. As illustrated, the bed partition is pivotally mounted to the body 16 by means of the hinge assembly 30. As best illustrated in FIGS. 2 and 3, the truck bed divider assembly 10 also includes a guide track 32 and a drive mechanism 34 that displaces the body 16 along the guide track.

Figure 3:
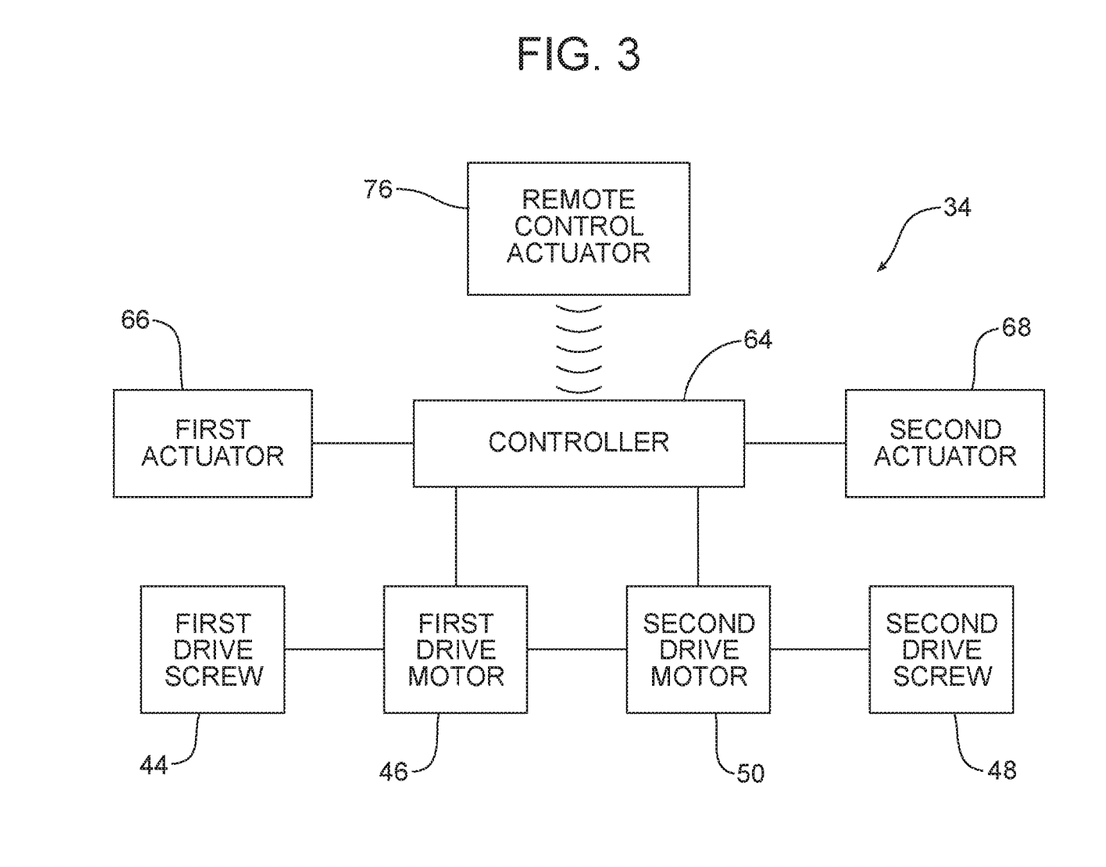
FIG. 3 is a schematic block diagram of the system for controlling the truck bed divider assembly and displacing the truck bed divider assembly along the truck bed between the front wall of the truck bed and the tailgate end of the truck bed.

As illustrated in FIGS. 2 and 3, the guide track 32 includes a first guide rail 36 at a first transverse end of the body 16, a second guide rail 38 at a second transverse end of the body, a third guide rail 40 at a first transverse end of the body and fourth guide rail 42 at the second transverse end of the body. The drive mechanism 34 includes a first drive screw 44 at a first transverse end of the body 16 and a first drive motor 46 for turning the first drive screw. In addition, the drive mechanism 34 includes a second drive screw 48 at a second transverse end of the body 16 and a second drive motor 50 for turning the second drive screw.

In the illustrated embodiment, the first drive screw 44 extends between and parallel to the first guide rail 36 and the third guide rail 40 in a recess 52 in the left truck bed sidewall 54 underneath the sidewall lip 56. The second drive screw 48 extends between and parallel to the second guide rail 38 and the fourth guide rail 42 in a recess 58 in the right bed sidewall 60 underneath the lip 62.

As further illustrated in FIG. 3, the drive mechanism 34 includes a controller 64 in the form of a computing device such as a dedicated microprocessor or electronic control unit (ECU) operating in accordance with instructions from appropriate control software. The controller 64 functions to ensure that the first drive motor 46 and the second drive motor 50 are synchronized and turn the first drive screw 44 and the second drive screw 48 in the same direction at the same speed. A first actuator 66 may be provided at the first end of the body 16. A second actuator 68 may be provided at the second end of the body 16. An operator may manipulate either actuator 66 or 68 in order to displace the truck bed divider assembly 10 longitudinally across the cargo bed 12 between the front bed wall 70 adjacent the pickup truck cab 72 and the truck bed tailgate 74. See also FIGS. 4-7.

Alternatively, or in addition to the first actuator 66 and the second actuator 68, the drive mechanism 34 may include a remote control actuator 76 (see FIG. 3) that is connected via a wireless communication network to the controller 64. Thus, an operator may carry the remote control actuator 76 with him. This provides the utmost convenience for the operator when the operator is seeking to adjust the position of the truck bed divider assembly 10 in the cargo bed 12 of the pickup truck 14.

As best illustrated in FIG. 2, the body 16 of the truck bed divider assembly 10 may comprise a carriage having a first slider 78 that rides along the first guide rail 36, a second slider 80 that smoothly slides along the second guide rail 38, a third slider 82 that slides along the third guide rail 40 and a fourth slider 84 that slides along the fourth guide rail 42. Further, the carriage or body 16 may also include a first drive link 86 that engages the first drive screw 44 and a second drive link 88 that engages the second drive screw 48. The drive links 86, 88 are fixed to the body 16.

The first slider 78, the second slider 80, the third slider 82 and the fourth slider 84 may all be made from a relatively hard, low-friction material such as nylon to ensure smooth sliding action along the respective first guide rail 36, second guide rail 38, third guide rail 40 and fourth guide rail 42. Thus, the carriage or body 16 may be smoothly displaced along the first guide rail 36, second guide rail 38, third guide rail 40 and fourth guide rail 42 between the front bed wall 70 and the tailgate 74 in the cargo bed 12 of the pickup truck 14 by rotating the first drive screw 44 and the second drive screw 48 in a clockwise or counter clockwise direction.

Reference is now made to FIGS. 4-7, which are top plan views illustrating various operating configurations of the truck bed divider assembly 10 which enhance the versatility of the truck bed divider assembly for various applications.

Figure 4:
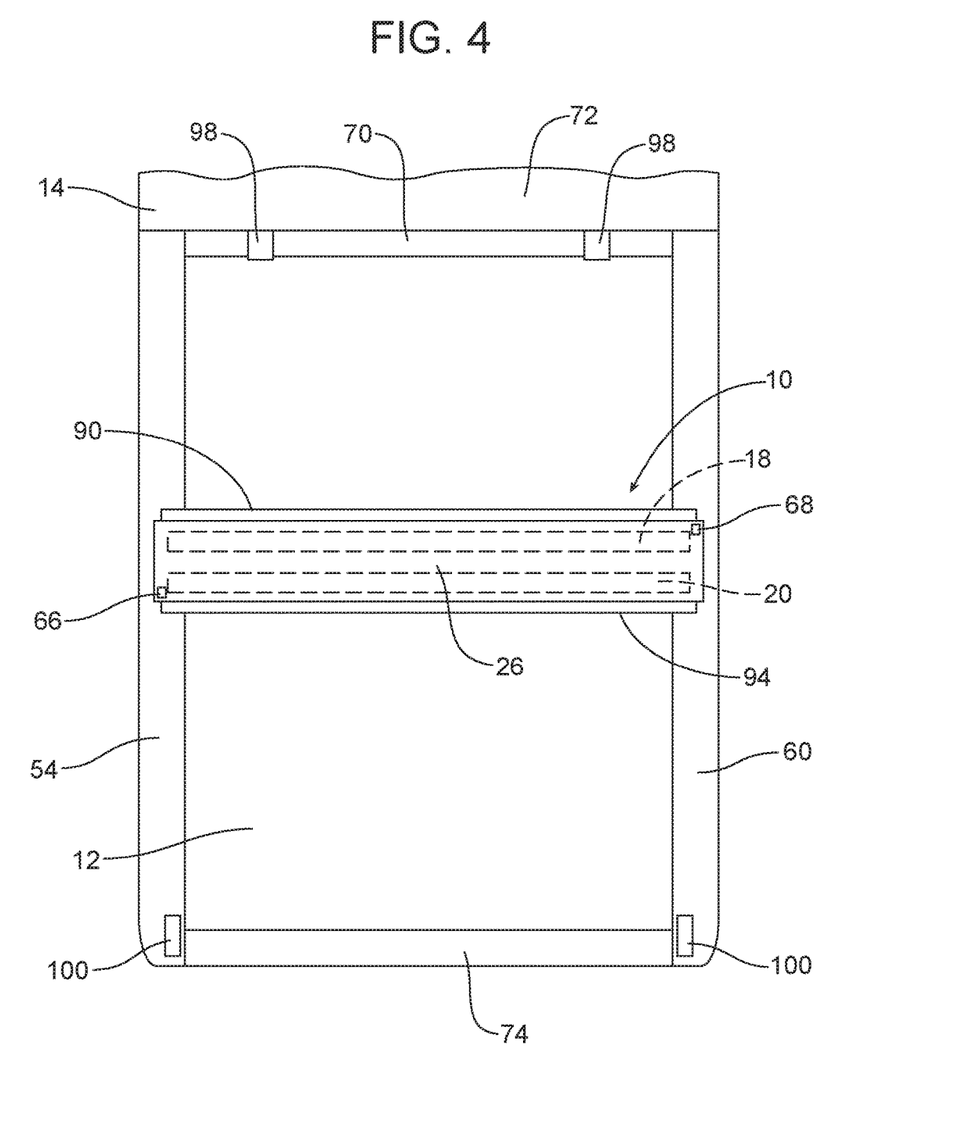
FIG. 4 is a top plan view of a pickup truck equipped with the truck bed divider assembly and illustrating both covers of the truck bed divider assembly in the stowed position.

As illustrated in FIG. 4, the truck bed divider assembly 10 is located so as to extend across the cargo bed 12 about midway between the front bed wall 70 and the tailgate 74 of the pickup truck 14. In this Figure, the first cover 22 is fully wound upon the first roller 18 in a stowed position underneath the cap 26. Similarly, the second cover 24 is fully wound upon the second roller 20 and also stowed beneath the cap 26. Note, particularly, the first lock bar 90 secured to the distal end 92 of the first cover 22 and the second lock bar 94 secured to the distal end 96 of the second cover 24.

Figure 5:
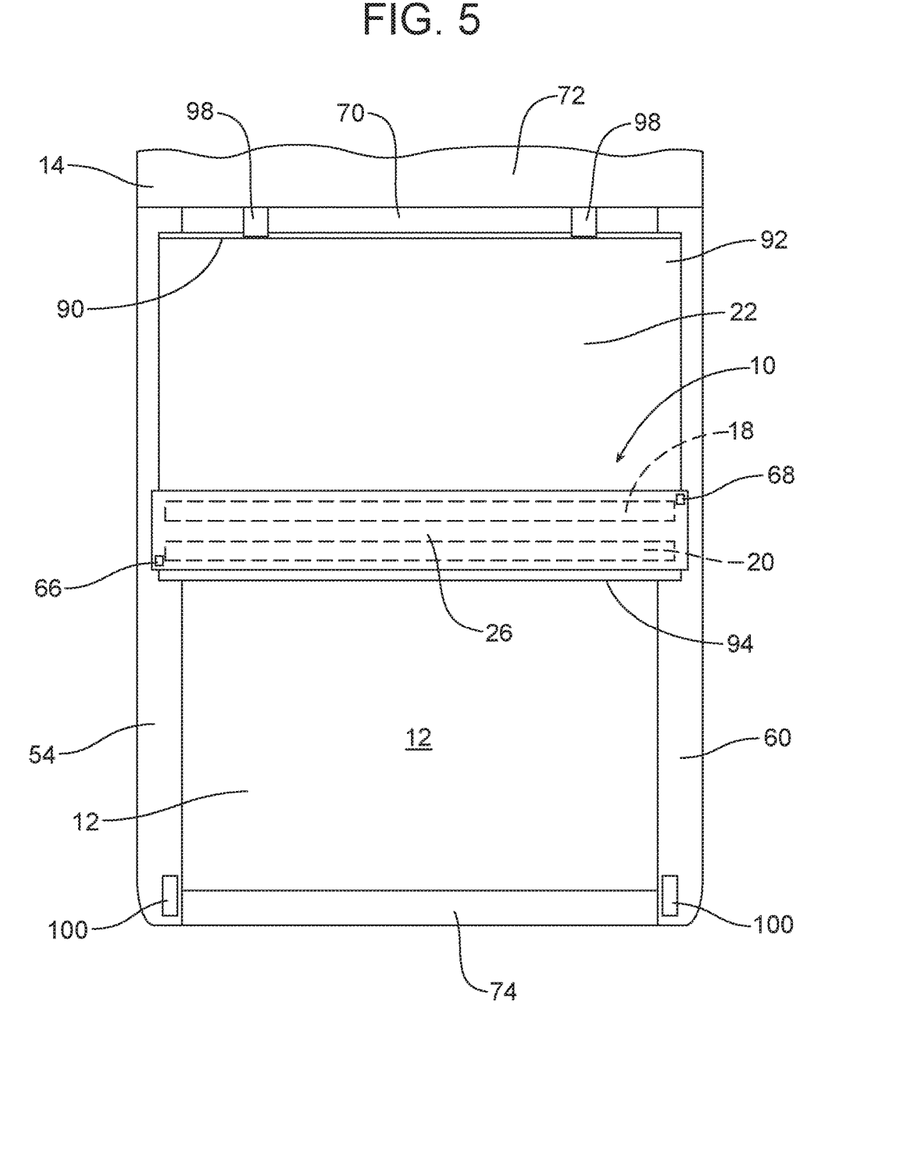
FIG. 5 is a view similar to FIG. 4 but illustrating the first cover in the fully deployed position and the second cover in the stowed position.

As illustrated in FIG. 5, the truck bed divider assembly 10 is located at approximately the same position, extending across the cargo bed 12 about midway between the front bed wall 70 and the tailgate 74. However, as illustrated in FIG. 5, the first cover 22 has been deployed from the first roller 18 so as to extend from the truck bed divider assembly 10 across the top of the cargo bed 12 all the way to the front bed wall 70. Here it should be appreciated that the first lock bar 90 is secured in a cooperating slot (not shown) in the first receivers 98 provided at the first end or front bed wall 70 of the pickup truck 14. The second cover 24 is maintained in the stowed position on the second roller 20 underneath the cap 26.

Figure 6:
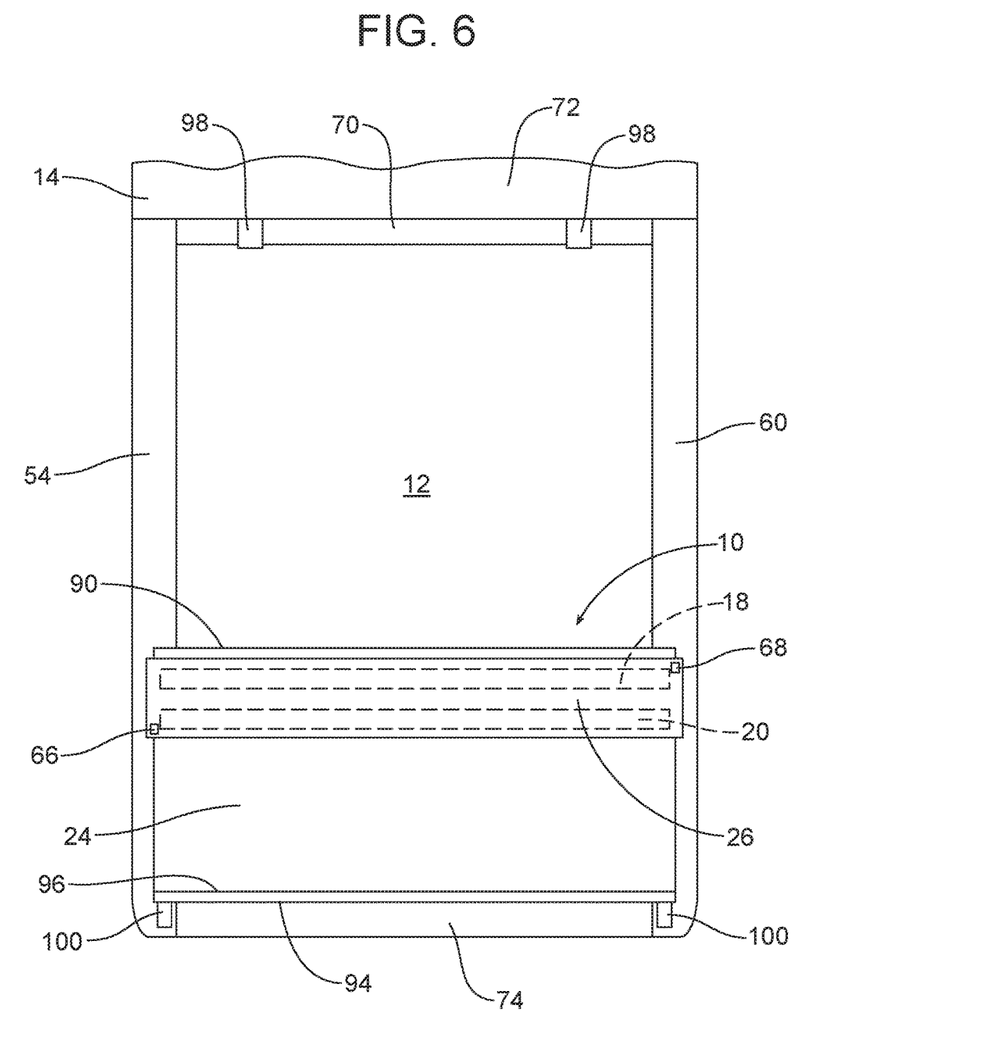
FIG. 6 is a view similar to FIGS. 4 and 5 but showing the first cover in the stowed position and the second cover in the deployed position.

As illustrated in FIG. 6, the truck bed divider assembly 10 has been displaced rearward in the cargo bed 12 toward the tailgate 74 by means of the drive mechanism 34. The first cover 22 is illustrated in the stowed position, fully wound on the first roller 18 underneath the cap 26. In contrast, the second cover 24 is deployed from the second roller 20 so as to extend from the truck bed divider assembly 10 to the tailgate 74. A second set of receivers 100, secured to the tops of the truck bed sidewalls 54, 60 receive and hold the second lock bar 94 secured to the second distal end 96 of the second cover 24. Thus, the rear portion of the cargo bed 12 is covered and concealed by the second cover 24.

Figure 7:
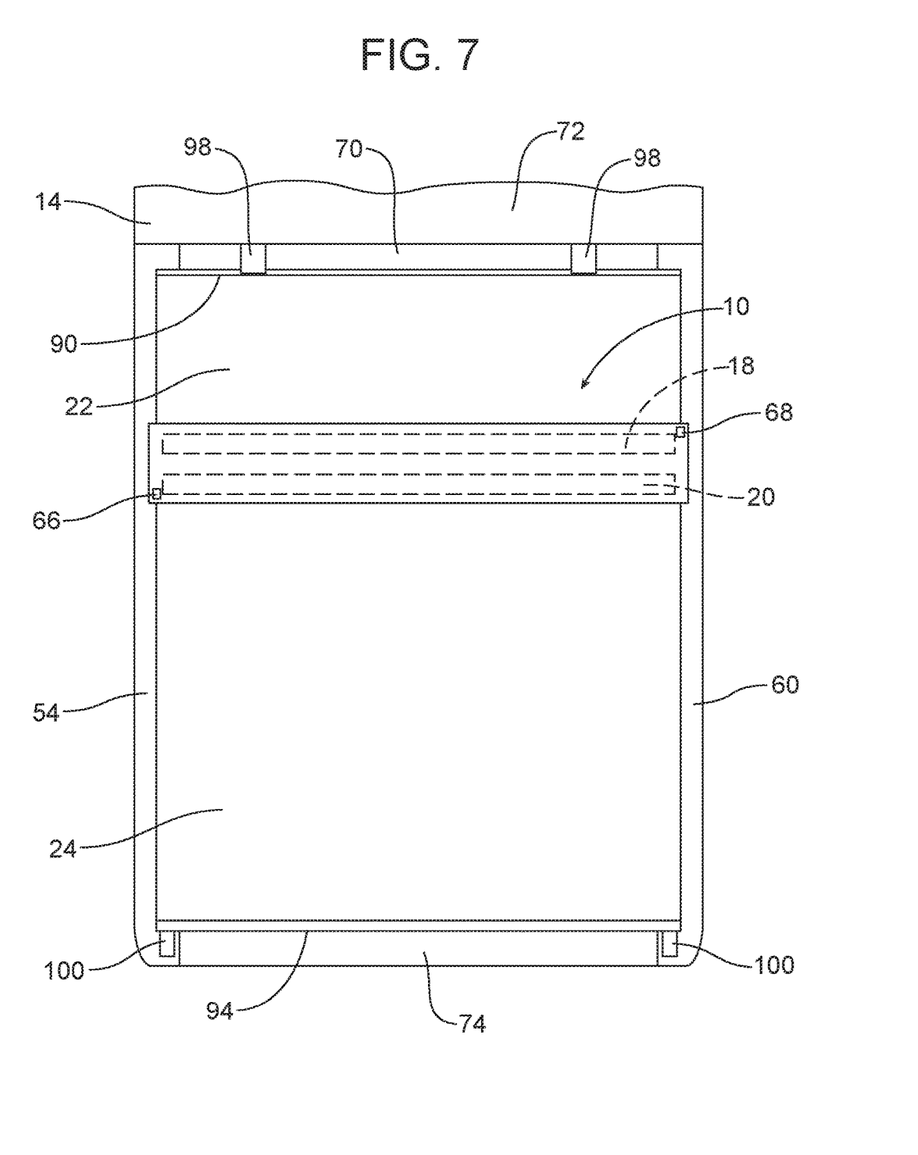
FIG. 7 is a view similar to FIGS. 4-6 but showing both covers in the deployed position.

Reference is now made to FIG. 7 illustrating the truck bed divider assembly 10 shifted toward the front bed wall 70 of the cargo bed 12 with the first cover 22 and the second cover 24 both deployed so that the cargo bed 12 is fully covered by the two covers 22, 24. Here it should be noted that the covers extend over the upper portion of the left and right bed sidewalls 54, 60.

The foregoing has been presented for purposes of illustration and description. It is not intended to be exhaustive or to limit the embodiments to the precise form disclosed. Obvious modifications and variations are possible in light of the above teachings. For example, the first roller 18 and the first cover 22 may be secured adjacent the cab 72 along the front bed wall 70 instead of being carried on the truck bed divider assembly 10 if desired. Further, one or both of the first roller 18 and second roller 20 may include a drive motor for extending and retracting the first cover 22 and the second cover 24. All such modifications and variations are possible in light of the above teachings. All such modifications and variations are within the scope of the appended claims when interpreted in accordance with the breadth to which they are fairly, legally and equitably entitled.

What is claimed:
1. A truck bed divider assembly, comprising:
a body;
a first roller carried on said body;
a first cover wound on said first roller;
a second roller carried on said body;
a second cover wound on said second roller; and
a guide track and a drive mechanism that displaces said body along said guide track.

2. The truck bed divider assembly of claim 1, further including a first lock bar at a first distal end of said first cover.

3. The truck bed divider assembly of claim 2, further including a first receiver at a first end of a truck bed, said first receiver being adapted to receive and hold said first lock bar when said first cover is deployed from said first roller.

4. The truck bed divider assembly of claim 3, further including a second lock bar at a second distal end of said second cover.

5. The truck bed divider assembly of claim 4, further including a second receiver at a second end of said truck bed, said second receiver being adapted to receive and hold said second lock bar when said second cover is deployed from said second roller.

6. The truck bed divider assembly of claim 5, wherein said guide track includes a first guide rail at a first transverse end of said body and a second guide rail at a second transverse end of said body.

7. The truck bed divider assembly of claim 6, wherein said drive mechanism includes a first drive screw at said first end of said body and a first drive motor for turning said first drive screw.

8. The truck bed divider assembly of claim 7, wherein said drive mechanism includes a second drive screw at said second end of said body and a second drive motor for turning said second drive screw.

9. The truck bed divider assembly of claim 8, further including a third guide rail at said first end of said body and a fourth guide rail at said second end of said body.

10. The truck bed divider assembly of claim 9, wherein said first drive screw extends between said first guide rail and said third guide rail.

11. The truck bed divider assembly of claim 10, wherein said second drive screw extends between said second guide rail and said fourth guide rail.

12. The truck bed divider assembly of claim 11, wherein said body comprises a carriage having a first slider on said first guide rail, a second slider on said second guide rail, a third slider on said third guide rail and a fourth slider on said fourth guide rail.

13. The truck bed divider assembly of claim 12, wherein said carriage further includes a first drive link engaging said first drive screw and a second drive link engaging said second drive screw.

14. The truck bed divider assembly of claim 13, wherein said body includes a cap overlying said first roller and said second roller.

15. The truck bed divider assembly of claim 14, including a bed partition.

16. The truck bed divider assembly of claim 15, including a hinge assembly pivotally connecting said bed partition to said body.

17. The truck bed divider assembly of claim 1, further including a bed partition.

18. The truck bed divider assembly of claim 17, including a hinge assembly pivotally connecting said bed partition to said body.

\* \* \* \* \*